United States Patent
Vaishnav et al.

(10) Patent No.: US 10,232,703 B2
(45) Date of Patent: Mar. 19, 2019

(54) LOUVERED SCREEN BAFFLE FOR REDUCTION OF FUEL SLOSH NOISE

(71) Applicant: Ford Global Technologies, LLC, Dearborn, MI (US)

(72) Inventors: Dhaval P. Vaishnav, Canton, MI (US); Maria Fernanda Maya Diaz, Mexico City (MX); Mike Dong, Ann Arbor, MI (US); Mohammad Usman, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 14/507,651

(22) Filed: Oct. 6, 2014

(65) Prior Publication Data
US 2016/0096428 A1    Apr. 7, 2016

(51) Int. Cl.
*B60K 15/03*   (2006.01)
*B60K 15/073*   (2006.01)
*B60K 15/077*   (2006.01)

(52) U.S. Cl.
CPC .......... *B60K 15/073* (2013.01); *B60K 15/077* (2013.01); *B60K 2015/0321* (2013.01); *B60K 2015/0344* (2013.01); *B60K 2015/0775* (2013.01)

(58) Field of Classification Search
CPC .... B60K 2015/0344; B60K 2015/0321; B60K 15/073
USPC ....................................................... 220/563
See application file for complete search history.

(56) References Cited

U.S. PATENT DOCUMENTS

| | | | | |
|---|---|---|---|---|
| 1,894,675 A * | 1/1933 | Dixon | ............. | B64D 37/02 220/563 |
| 2,214,330 A * | 9/1940 | Henderson | ............. | B64D 37/02 206/521 |
| 2,806,622 A * | 9/1957 | Leirer | ............. | B60K 15/077 220/4.14 |
| 6,293,420 B1 * | 9/2001 | Richter | ............. | B60K 15/077 220/501 |
| 6,408,874 B1 | 6/2002 | Keller | | |
| 6,412,853 B1 * | 7/2002 | Richardson | ............. | B62D 35/00 180/903 |
| 6,736,282 B2 | 5/2004 | Krogull | | |
| 6,805,193 B2 * | 10/2004 | Hu | ............. | F28F 1/128 165/152 |

(Continued)

FOREIGN PATENT DOCUMENTS

| CN | 201922925 U | 8/2011 |
|---|---|---|
| KR | 20050045382 A | 5/2005 |

(Continued)

*Primary Examiner* — Stephen Castellano
(74) *Attorney, Agent, or Firm* — Julia Voutyras; McCoy Russell LLP

(57) ABSTRACT

A system for reducing fuel slosh noise in a storage tank is described. In one particular example, the system comprises a slatted baffle with angularly arranged louvers extending therefrom to reduce sloshing noise in the tank by redirecting fuel waves while preventing surface wave collisions in the tank. In this way, the louvered baffle has the ability to provide different fuel flows based on the direction of flow incident on the slatted baffle, which may enhance the driving experience, particularly in hybrid and start-stop vehicles, where periods exist in the drive cycle where background engine noise is absent.

15 Claims, 14 Drawing Sheets

(56) References Cited

U.S. PATENT DOCUMENTS

| | | | | |
|---|---|---|---|---|
| 2005/0077036 A1* | 4/2005 | Antonijevic | ............ | F28F 1/128 |
| | | | | 165/182 |
| 2008/0035649 A1* | 2/2008 | Ohlsson | ................ | B60K 15/03 |
| | | | | 220/564 |
| 2012/0116620 A1* | 5/2012 | Wang | .................... | B60K 35/00 |
| | | | | 701/22 |
| 2014/0212311 A1* | 7/2014 | Moseley | ................ | F04B 53/20 |
| | | | | 417/415 |

FOREIGN PATENT DOCUMENTS

| KR | 20070040234 A | 4/2007 |
|---|---|---|
| KR | 20090047108 A | 5/2009 |
| KR | 20120008821 A | 2/2012 |

\* cited by examiner

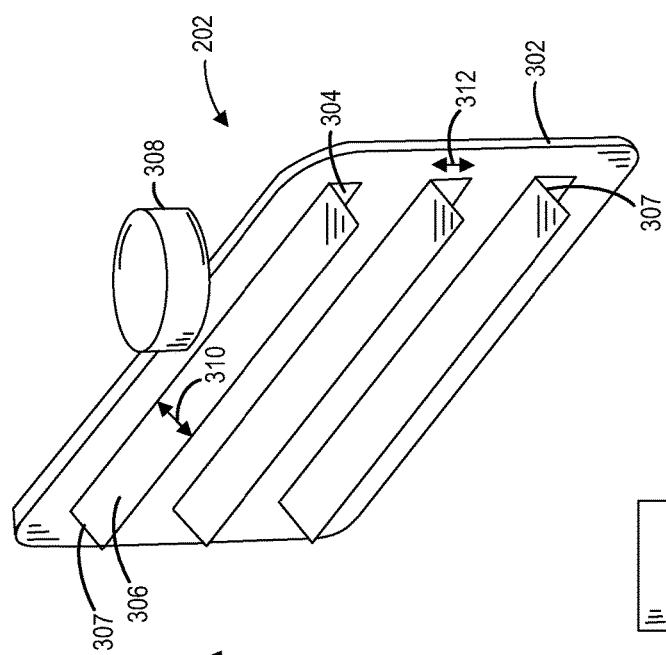
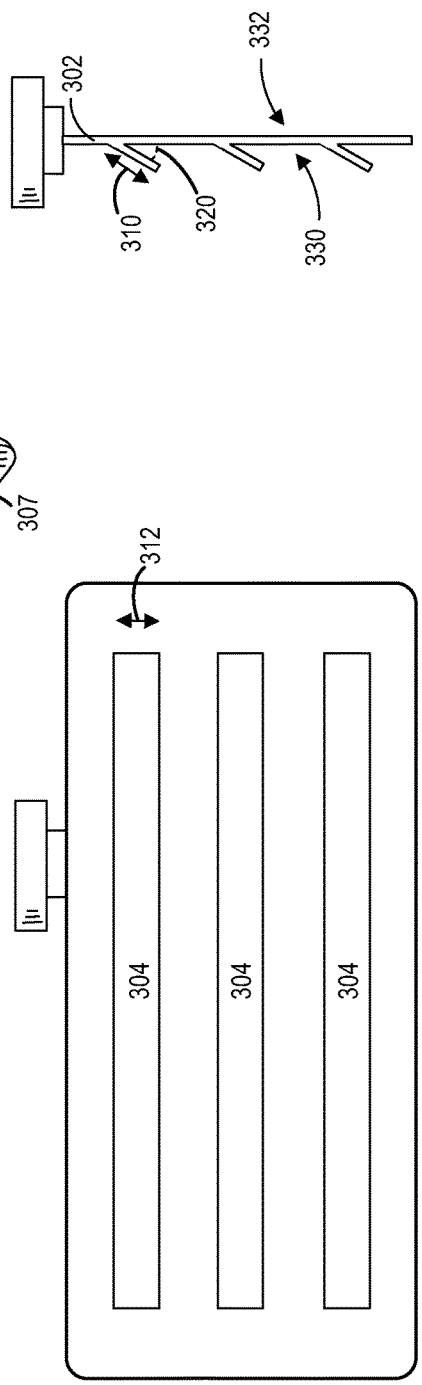
FIG. 3A
FIG. 3B
FIG. 3C

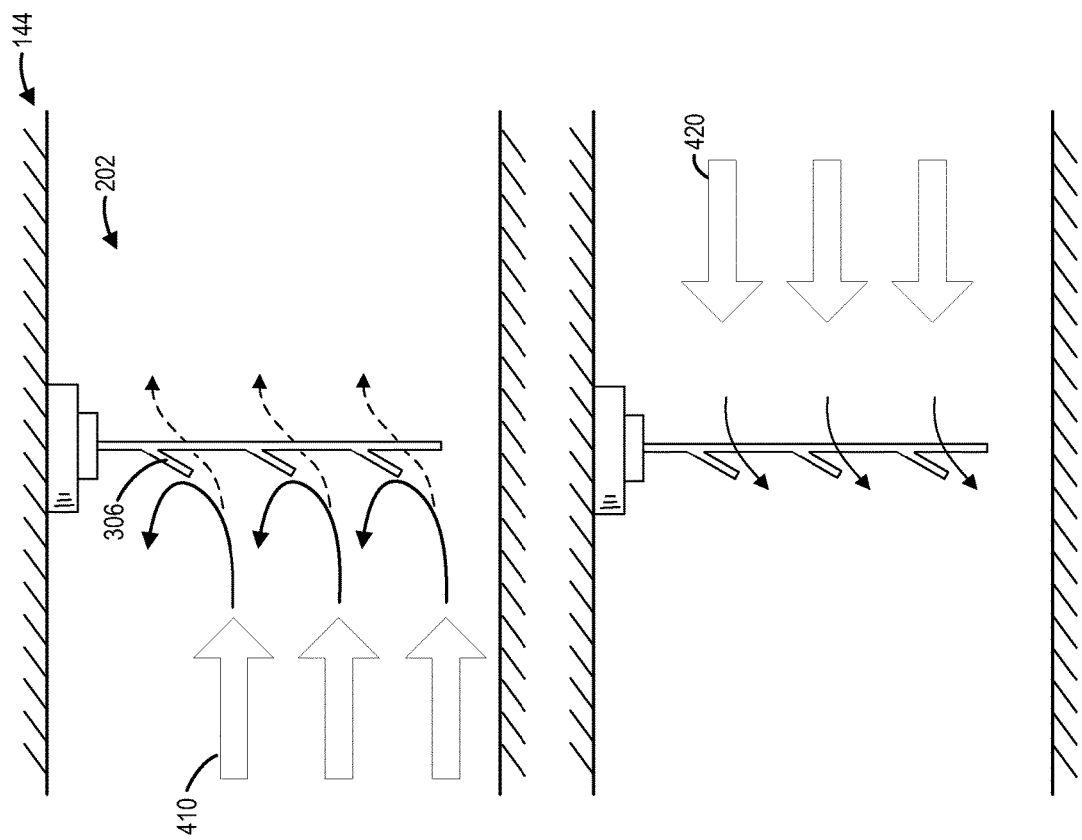

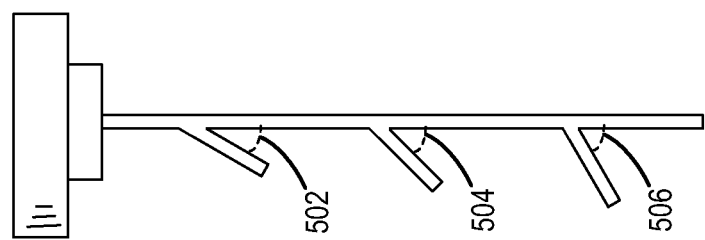

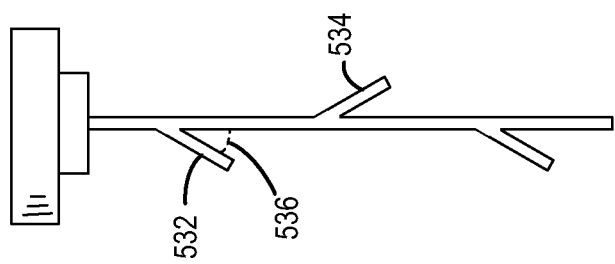
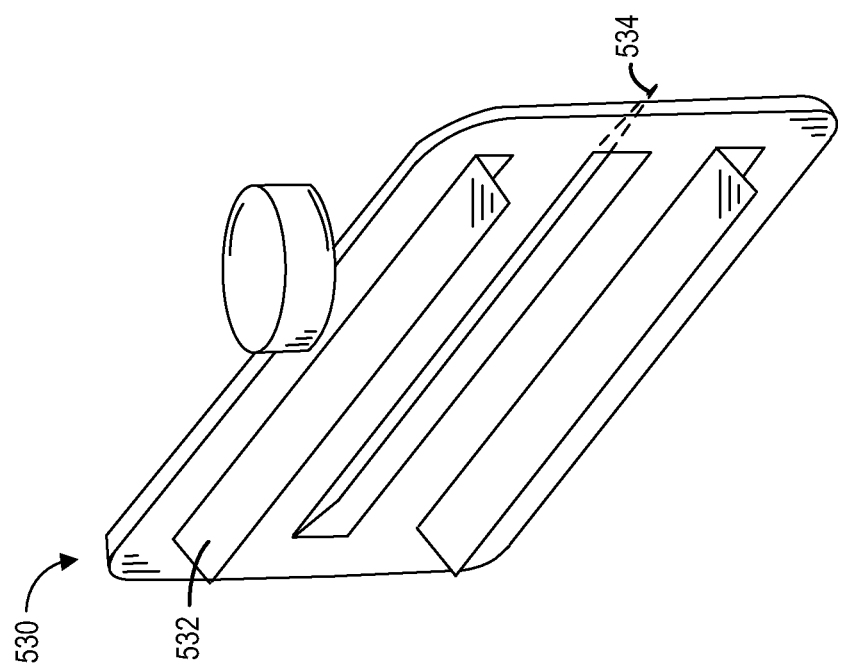
FIG. 5F
FIG. 5E

LOUVERED SCREEN BAFFLE FOR REDUCTION OF FUEL SLOSH NOISE

FIELD

The present description relates to a fuel baffle with louvered screens for reducing fuel slosh noise in a vehicle fuel tank.

BACKGROUND AND SUMMARY

Fuel slosh occurs when a vehicle with a fully or partially filled fuel tank accelerates, decelerates or executes a sharp turn. In response, liquid waves develop and collide and splash on the tank surface causing vibrations to develop in the fuel tank. Such vibrations generate air borne and structure based noises that are audible to a vehicle passenger. Slosh noise is particularly problematic for hybrid and start-stop vehicles since periods exist in the drive cycle where background engine noise is absent.

Previous attempts to alleviate slosh noise within the fuel tank have several shortcomings and may actually contribute to the noise perceived by a vehicle operator in some instances. For example, KR1020090047108 discloses a baffle plate for a fuel tank with a spring assembly that is hinged at the top and tilts under a sloshing effect. However, numerous problems arise from the baffle described. Namely, because a fuel tank vibrates due to road conditions during normal driving, the presence of a baffle, hinge, and spring assembly may cause interaction between the movable parts and additional noise. Moving parts inside the fuel tank are thus undesirable since these parts can interact with one another and amplify the noise present. Further, if the interacting parts have a natural frequency that matches one or more of the road load vibrations or sloshing effects, a resonance condition can develop that leads to a structural failure of the moving parts and/or baffle, which can be addressed at an additional cost to the vehicle owner.

The inventors have recognized issues with such approaches and herein disclose a fuel tank comprising a slatted baffle integrally formed with a louver plate. The inventors have further recognized that the louvered plates may be configured to alter a direction of the fuel flow within the fuel tank to counteract wave collisions leading to fuel slosh. In one example, the direction of fuel flow through the slatted baffle is diverted toward the bottom of the fuel tank to reduce air entrainment in the liquid. In another example, the louvered plates act cooperatively to divert the fuel flow to the tank bottom while smoothly merging the transient flow across the baffle with a surface flow in order to reduce a wave impact and/or other turbulence that may develop when a vehicle is in motion. For instance, each angled louver plate may have a different fixed inclination angle relative to the plane of the baffle while cooperatively directing the fuel flow toward the tank bottom while smoothly merging a plurality of fuel flows present. One advantage of the slatted baffle described is that turbulence within the tank may be reduced. In this way, the technical result is achieved that the noise emanating from the fuel tank, referred to as fuel slosh, is reduced, which creates a more pleasing driving experience.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 3A-C depict a louvered baffle in greater detail to illustrate slatted openings and angled louver plates attached to the top of each opening;

FIGS. 4A and B schematically illustrate fuel flow restrictions based on wave direction incident on the slatted baffle;

DETAILED DESCRIPTION

Figure 1:
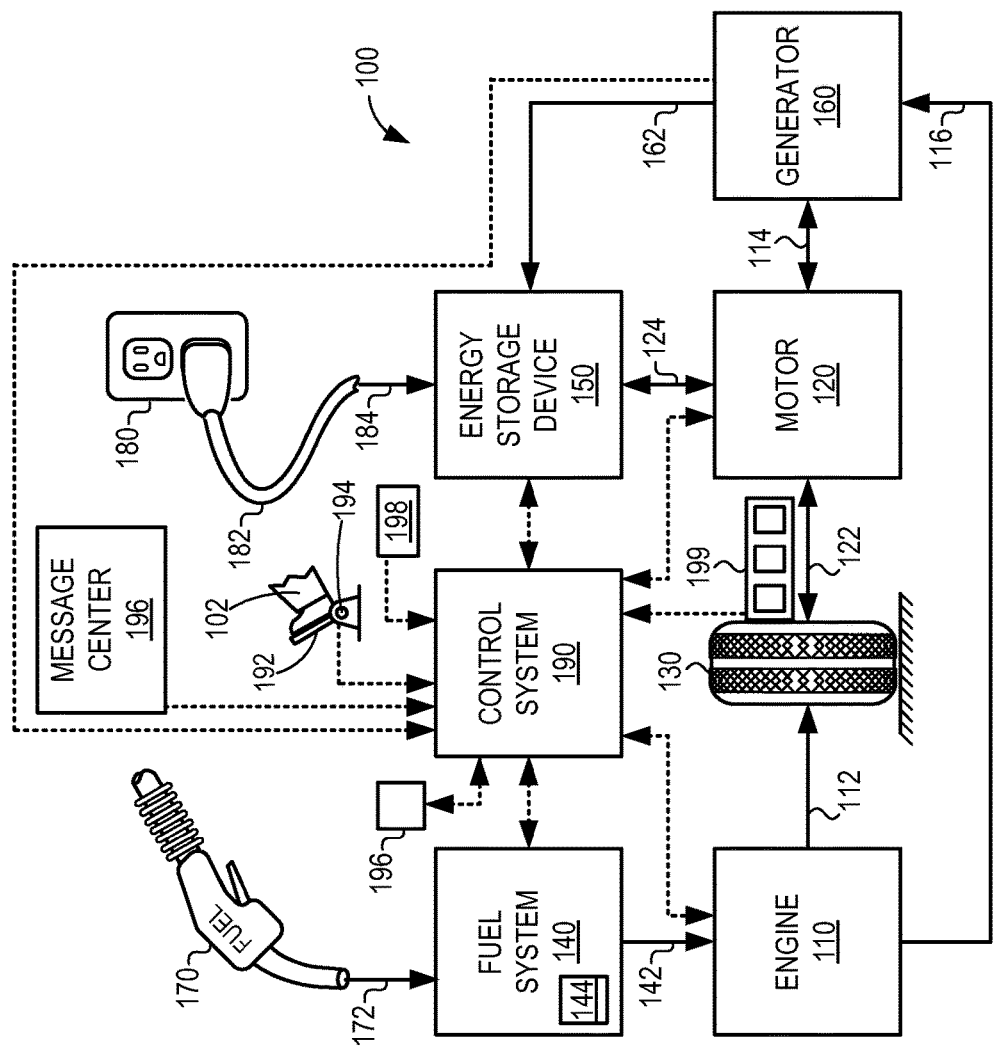
FIG. 1 illustrates an example hybrid vehicle propulsion system according to the present disclosure.
Figure 2:
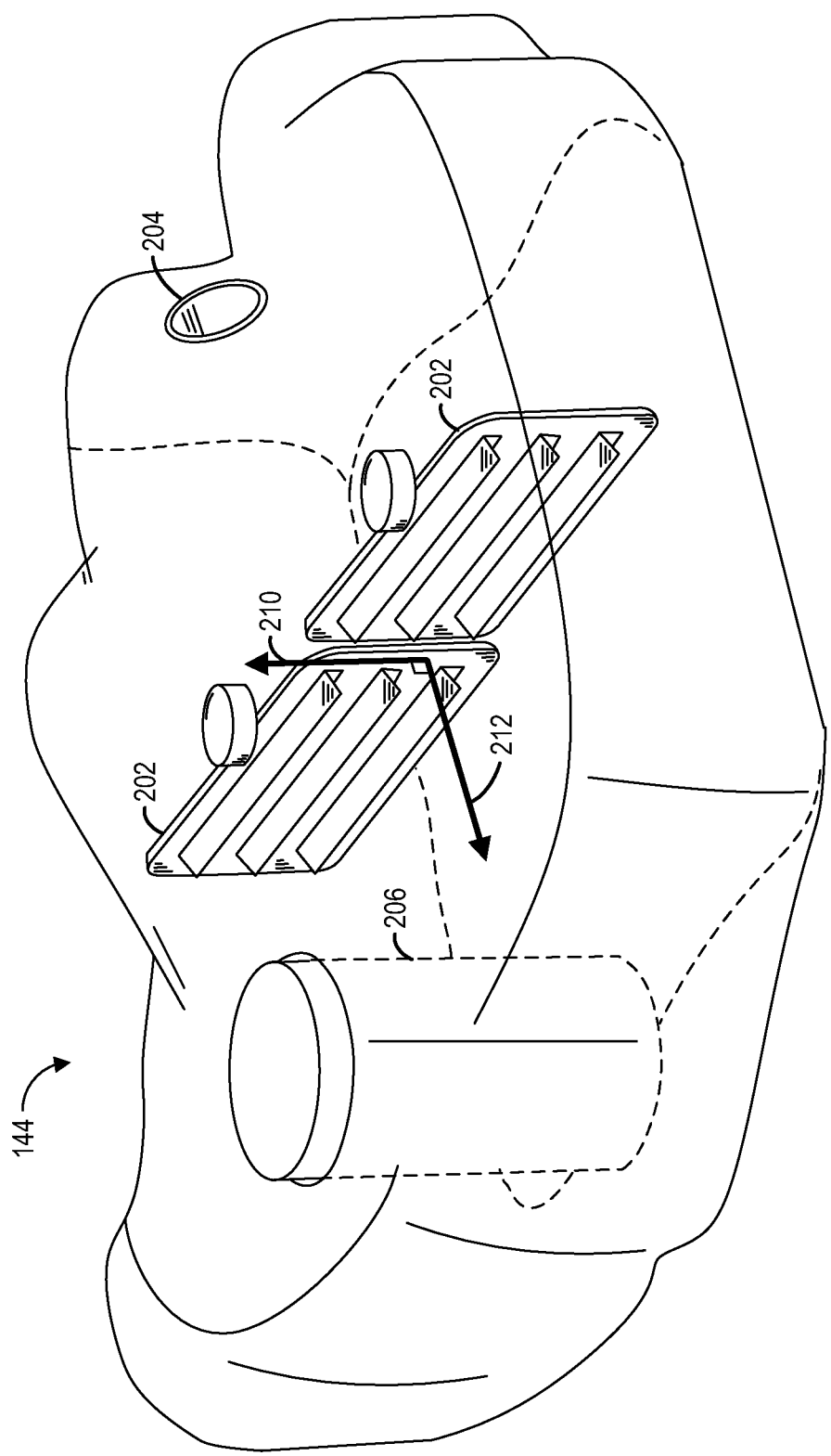
FIG. 2 illustrates an example automotive fuel tank with louvered baffles according to the present disclosure.
Figure 6A:
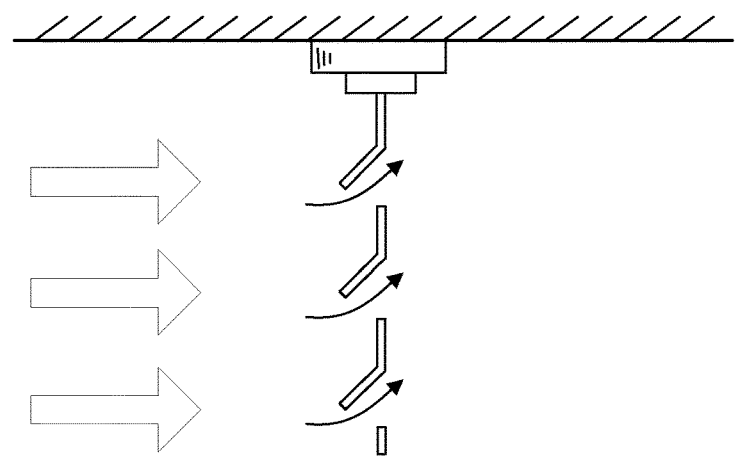
FIGS. 6A-D show example fuel flows for still additional configurations wherein louvered plates include horizontal extensions that extend beyond the baffle onto the other side.
Figure 6B:
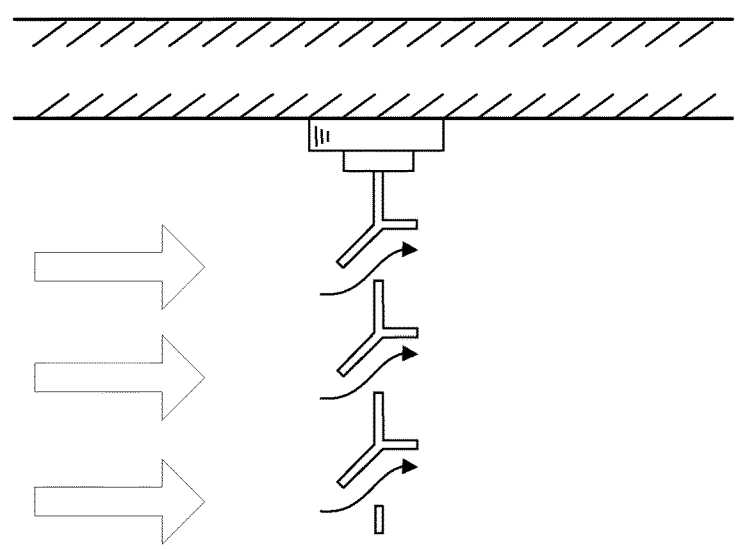
Figure 6C:
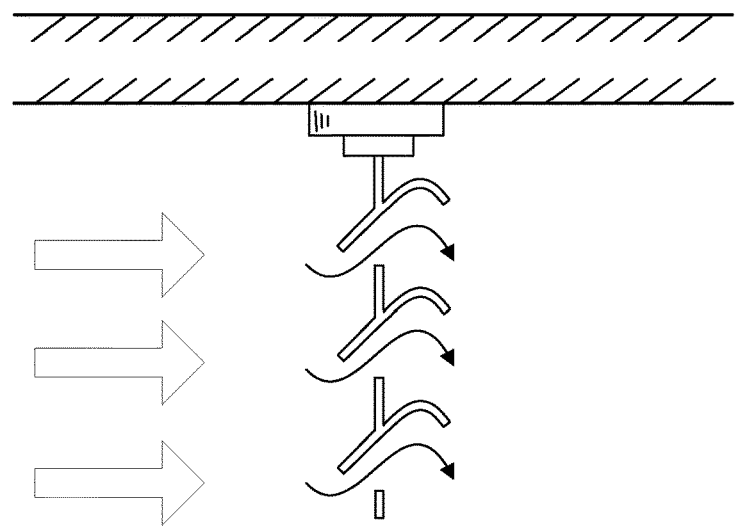
Figure 7A:
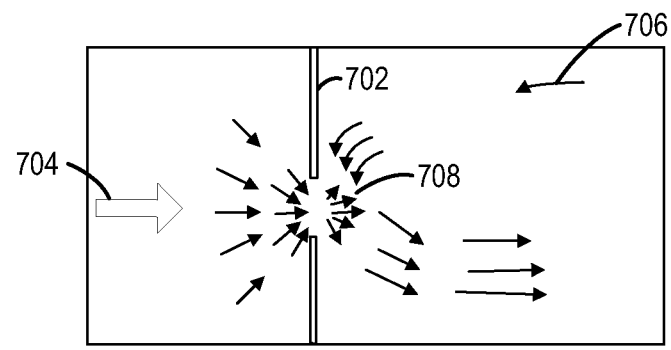
FIGS. 7A-C depict example wave flows according to the present description compared to the turbulent flows of an existing baffle.
Figure 7B:
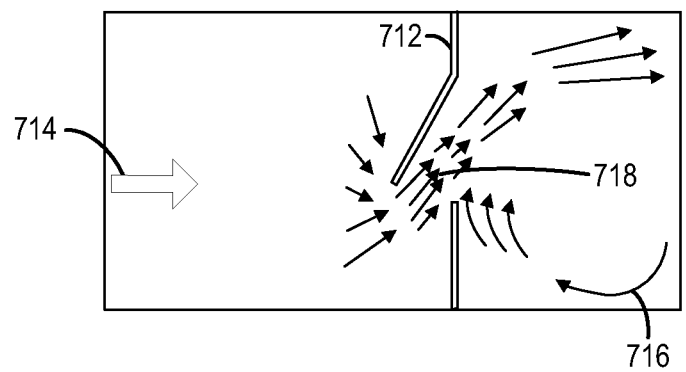
Figure 7C:
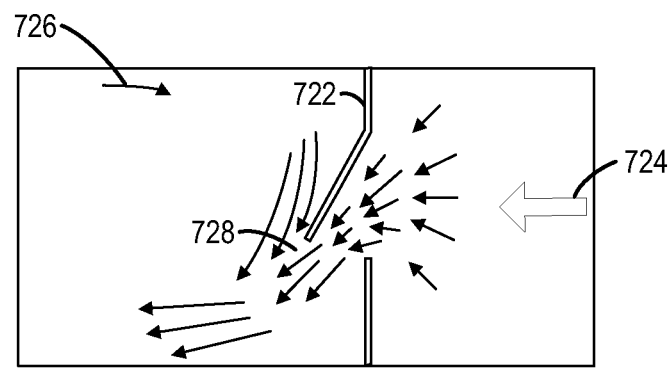

The slatted baffle according to the present description may reduce fuel slosh noise in a vehicle fuel tank, such as the fuel tank of a hybrid electric or start-stop vehicle. Although slosh noise may be more pronounced in hybrid and/or start-stop vehicles, louvered screen baffles according to the present description are not limited to such vehicles. Rather, the louvered baffles described may be implemented on any type of vehicle and/or into automobile fuel tanks of any style and having any shape. For simplicity of description, FIG. 1 shows a schematic engine diagram of a hybrid electric vehicle that includes a fuel tank with a slatted baffle integrally formed with angled louver plates. Then, FIG. 2 illustrates the example automotive fuel tank in greater detail. FIGS. 3A-C depict the louvered baffle according to one example while FIGS. 4A and B schematically illustrate fuel flow restrictions based on the direction of wave travel incident on the slatted baffle. FIGS. 5A-O show variations of louvered plate types and arrangements thereof for introducing different flow effects within the fuel tank whereas FIGS. 6A-C show example flow restrictions for additional configurations that include a horizontal extension that extends beyond the baffle on the other side. FIGS. 7A-C depict example wave flows for a slatted baffle configured according to the present description relative to one example existing baffles that is prone to turbulent flows, which increases fuel slosh noise emanating from the fuel tank.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated. As described herein, the vehicle may be operated at a lower noise level during these periods, which renders fuel slosh noise problematic since hybrid and start-stop vehicles are often operated with periods in the drive cycle where background engine noise is absent.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may also be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160. As described herein, fuel tank 144 is configured with a slatted louvered baffle for reducing slosh noise during driving.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196. As described herein, engine 110 may be periodically set to a deactivated state where the consumption of fuel at the engine is significantly reduced or discontinued. Where engine 110 is deactivated for extended periods of time, the fuel stored at fuel tank 144 may take a longer time to be depleted by the engine.

FIG. 2 illustrates an example automotive fuel tank such as fuel tank 144, which in some embodiments may be a liquid storage system. Fuel tank 144 includes louvered baffles 202. As described, fuel tank 144 comprises a securely attached baffle with a plurality of openings covered by angled louver plates extending outward from the baffle and arranged over each opening. Although the exemplary automobile tank shows one arrangement of the louvered baffles within the fuel tank, other arrangements are possible. In addition, single or multiple baffles may be included depending on the type of tank within the vehicle, and/or specific application. In this way, the louvered baffle may be adapted for use in a fuel tank of any shape. Fuel tank 144 is shown with a refueling pipe 204 for receiving fuel via a fuel dispensing device such as 170 in FIG. 1. Fuel delivery module 206 may also be included for delivering the fuel to engine 110 via fuel system 140.

As vehicle 100 navigates terrain, fuel stored within fuel tank 144 may undergo various motions that produce slosh noise due to transient flow. For simplicity, the description herein refers to wave motion along a longitudinal axis of the fuel tank perpendicular to louvered baffles 202. However, other liquid motions are possible and may include wave motions along a transverse axis of the fuel tank parallel to the louvered baffles, and/or circular flows, or eddies, that develop during a sharp turn. Louvered baffles 202 further comprise angled louver plates integrally formed therewith that reduce the wave motion in the fuel tank to reduce slosh noise.

In one example, the exemplary automobile is a hybrid-electric vehicle. Thus, the system comprises a hybrid-electric vehicle powertrain including an engine along with a fuel storage tank for storing engine fuel on-board the vehicle according to the present description. That is, the fuel storage tank includes a baffle formed in only one piece, a plurality of rectangular openings within the baffle for allowing liquid flow, and a plurality of angled louver plates extending outward from the baffle with a louver length substantially equal to or exceeding a width of the rectangular opening, each angled louver plate positioned over an opening. Because liquid naturally collects along the bottom of the tank, the exemplary system may be configured with a bottom edge of the baffle within the fuel storage tank positioned near the bottom of the fuel storage tank, wherein a plane of the baffle is arranged perpendicular (e.g., along axis 210 of FIG. 2) to a longitudinal axis of the vehicle (e.g., axis 212), which aligns with the motion of the vehicle. According to one example described in greater detail below, the size of the rectangular openings increase based on a vertical position of the rectangular opening relative to a top surface of the fuel storage tank where the size of the rectangular openings are determined by an angle of the louver plate extending outward from the baffle relative to the plane of the baffle. Increasing the opening size based on the position of the opening relative to the top of the fuel tank allows liquid near the bottom of the baffle to flow more freely while the liquid near the top of the baffle is more restricted. Such a configuration advantageously reduces a wave motion to reduce the slosh noise within the fuel tank.

FIGS. 3A-C depict a louvered baffle 202 in greater detail. For example, FIG. 3A shows a perspective view of the baffle, which includes baffle plane 302 formed with a plurality of rectangular openings 304. A rectangular opening is a through-opening comprising an absence of material in the wall of the baffle plane. With this structure, fuel within the tank can transiently navigate across the plane of the baffle from one side of the fuel tank to the other. Further, when configured according to the present disclosure, fuel crossing baffle plane 302 may collide with an angled louver plate 306 that acts to redirect the liquid within the tank while dissipating the wave energy, therefore reducing the slosh noise.

As shown in the example baffle of FIG. 3C, baffle plane 302 of baffle 202 comprises a front face 330 parallel to rear face 332. In this way, the plane of the baffle is mounted vertically within the fuel tank with both faces arranged in a vertical direction perpendicular to the ground on which the vehicle sits. Liquids naturally conform to the shape of the container in which they are placed. Thus, liquid placed in the tank will have a free surface parallel to the ground on which the vehicle sits. When the baffle is configured according to the present disclosure, the vertical planar arrangement of baffle plane 302 provides for optimal positioning of a louvered baffle within the liquid in a way that counteracts wave motions occurring within the fuel tank.

According to the present description, baffle plane 302 is formed integrally with angled louver plates 306 attached to the top of the openings, for example, as shown in FIG. 3A. FIG. 3A illustrates the shape of the rectangular openings relative to the louvered plates attached thereabove. As shown, louvered plates 306 are formed along only a single edge of baffle plane 302. Thus, louvered plates 306 extend outward from baffle plane 302 with an angular orientation for altering the direction of liquid flow in the fuel tank. As described herein, the fuel flow is redirected in a downward direction after transiently navigating across the plane of the baffle. According to FIG. 3A, louvered plates 306 attach to only one edge of the opening, which may advantageously allow liquid to flow around louver plate side edges 307 in some instances. For example, liquid flow around side edges 307 may allow for redirecting liquid in the plane of the opening in addition to redirecting it in the downward direction based on an interaction with one or more of the angled louver plates. The additional flow around the side of an angled louver plate may allow increased dissipation that further reduces fuel slosh within the tank.

FIG. 3B illustrates the shape of a rectangular opening without louvered plates according to the present disclosure. For simplicity, baffle and plate orientations are described using dimensional parameters, such as louver plate length 310 (e.g., L) that refers to the distance that a louver plate extends outwardly from baffle plane 302; rectangular opening width 312 (e.g., W) describing the size of an opening the vertical direction of baffle plane 302; and louver plate angle 320 (e.g., α) that is the angle formed between the louver plate and the baffle plane. However, other orientations and opening shapes are also possible. As described in detail below, angled louver plates extending outward from baffle plane 302 may be designed to cooperatively direct a liquid flow within the storage tank that reduces a wave impact based on louver plate orientation and arrangement thereof. Connector 308 is included for securely assembling the louvered baffle 202 to fuel tank 144. Although secure connector 308 is shown with a cylindrical shape, other attachment shapes and/or types are possible. For example, in another configuration, the louvered baffles may attach to the fuel tank via a side mounting that forms a secure connection therewith.

According to one example, louver plate length 310 exceeds rectangular width 312, which is the width of the rectangular opening. For simplicity, the liquid storage system further includes angled louver plates extending uniformly outward from the baffle, that is, with a constant inclination, which refers to a constant angular incline relative to the plane of the baffle. As described, the range of inclination angle may reside within 15° to 65° relative to baffle plane 302. To reduce slosh noise, the device for use in a fuel storage tank includes no additional pieces and is thus a louvered baffle formed in one piece. In other words, while the rectangular opening within the baffle allows liquid to flow therethrough, a plurality of angled louver plates extending outward from the baffle are integrally formed within the baffle, where each angled louver plate is positioned over an opening. In one particular example, the width of rectangular width 312 falls within a range of 10 to 25 mm while the angled louvers 306 extend outward from the baffle with the same inclination angle in the range of 15° to 65°. However, in another example, the width of rectangular width 312 falls within a range of 10 to 25 mm while angled louver plates 306 extend outward from the baffle with a fixed incline angle in a range of 15° to 65° but act cooperatively to direct a flow of liquid within the fuel tank. That is, the inclination angle of each louver plate is different based on a desired flow effect. In the example described, a flow is restricted at the top of the baffle (e.g., smaller inclination angle at the top of the fuel tank) whereas the fuel flows more freely near the bottom of the baffle (e.g., because a larger inclination angle is present at the bottom of the baffle, as shown in FIG. 5A).

Integrally formed slatted baffles with angled louver plates may achieve certain advantages for reducing slosh noise within the fuel tank. As a non-limiting example, the slatted baffle may be made out of plastic or metal, and in some embodiments may be based on the material of the fuel tank. For example, a metal baffle may be prepared by employing stamping and/or bending operations to generate openings and louver plates within the baffle. Alternatively, a plastic baffle may be formed by an injection molding process to prepare a baffle having a desired shape and louver plate arrangement. Moreover, mounting of the baffle within the fuel tank may occur at any position. For example, in some implementations, the baffle may be a top mounted baffle. However, the baffle may alternatively be bottom mounted or side mounted as long as louver orientation with respect to liquid flow occurs in a manner consistent with the description herein.

Fuel sloshes inside an automobile tank whenever a vehicle experiences a change in velocity due to acceleration, deceleration and/or turn execution. Under these conditions, fuel waves are created that travel from one end of the tank to the opposite end. To achieve optimal results, the slatted baffle according to the present disclosure is placed perpendicular to a wave direction along a longitudinal axis of the fuel tank. Depending upon the specific orientation of the louver plates relative to a wave direction, louvered screen baffles therefore act as a substantially solid surface that achieves a high fuel flow blockage as shown in FIG. 4A as well as a slatted surface having a low flow blockage but alters the direction of the fuel flow, as shown in FIG. 4B. Thus, the louvered baffle according to the present disclosure has the ability to provide different flow restrictions based on the direction of liquid flow incident on the slatted baffle.

FIGS. 4A and B schematically illustrate fuel flow restrictions based on incident wave direction. As shown in FIG. 4A, wave motion 410 depicts a wave travelling from left to right such that louvered baffle 202, and specifically angled louver plates 306 restrict fuel flow by at least partially covering the rectangular shaped openings (not shown). With this arrangement, most of the liquid flow is blocked and thereby prevented from traversing the baffle plane. However, a portion of the liquid may flow across the baffle plane. In this way, louvered screen baffles according to the present description may act as a substantially solid baffle. Conversely, FIG. 4B shows that wave motion 420 from right to left allows the liquid to traverse the rectangular opening and thus pass easily through the opening onto the other side of the louvered screen baffle. In this way, louvered baffle 202 also acts as a slatted baffle and alters direction of the liquid flow. As further described, the louvered plates may divert liquid flow in the downward direction. Hence, liquid fuel advantageously traverses the baffle in a flow stream that merges with the rest of the liquid present in the fuel tank away from the baffle. Without this arrangement, fuel may exit the baffle in a concentrated stream. Concentrated streams are problematic because the streams travel through the air and fall upon the liquid at some distance away from the baffle. When this occurs, additional slosh noise may be created due to: 1) splashing and turbulence created by the liquid stream falling on the liquid, which manifests as increased slosh noise; and 2) substantial air entrainment that occurs when a liquid stream separates from liquid remaining in the pooled liquid on the opposite side of the baffle, and merges with the liquid again after falling thereupon. Then, when entrained air comes out of liquid in terms of small bubbles, additional turbulence noise may be generated in the fuel tank. Therefore, a reduction of air entrainment may advantageously reduce fuel slosh noise. According to the present disclosure, the slatted baffle guides liquid calmly along the angled louver surfaces in the downward direction with minimal air entrainment. Hence, a baffle configured according to the present description addresses both of the noise generating mechanisms above, and further provides a substantial reduction in the noise level. Another root-cause of slosh noise is the direct impact of fuel waves on the front and rear surfaces of the fuel tank. However, such impacts are further reduced by louver plates as the angled louvers change the flow direction of the liquid by deflecting the liquid in a downward direction.

Hence, according to the present disclosure, noise reduction is enhanced by combining the effects of a solid and slatted baffle based on a direction of liquid flow across the face of the baffle plate. This allows air entrainment to be eliminated when liquids pass through the baffle and further reduces the wave impact on fuel tank walls to reduce slosh noise.

FIGS. 5A-O show other non-limiting configurations of the slatted baffle and angled louver plates according to the present description. For instance, various louvered plate types and arrangements may be implemented to achieve a desired flow pattern within the tank and/or noise dissipation effect.

For example, FIG. 5A illustrates a slatted baffle configured with louver plates having different angles. In this way, louvered plates in the top row such as first inclination 502 may have a smaller angle ($\alpha$) than louvered plates therebelow (e.g., second inclination 504 and third inclination 506) that exhibit a progressively larger angle ($\alpha$). With this configuration, a greater flow restriction may exist closer to the top of the baffle whereas the liquid near the bottom of the baffle flows more freely across the plane of the baffle in either direction. Thus, the liquid storage system may be configured with each louver plate having a different fixed inclination angle relative to the baffle plate. As described herein, different inclination angles fall within a range of 15° to 65°, however the specific arrangement of the different inclination angles are non-limiting so long as the different inclination angles act to cooperatively direct a flow of liquid within the liquid storage system while minimizing slosh noise.

Thus, for example, the louvered baffle may be included within a fuel tank with a louver plate extending from the baffle at a first fixed angle relative to the plane of the baffle and at least a second louver plate included and positioned above at least a second slot. When arranged as shown in FIG. 5A, the second louver plate extending from the baffle may be inclined at a different angle relative to the plane of the baffle than the first fixed angle such that an angle size progressively increases from the top louver plate to the bottom louver plate of the baffle.

In a wave, a velocity of liquid near the bottom of the wave is less than the velocity of liquid near the free surface due to viscous effects. The motion of the liquid near the free surface is further subjected to inertial forces and may travel at a higher velocity. The difference in velocities causes waves to fold onto the liquid surface similar to waves surfed in the ocean. This effect is referred to as wave folding. Wave folding increases the turbulence present in the tank and noise emanating therefrom. Configurations described reduce and/or eliminate wave folding by providing enhanced flow guides and increased restrictions to the movement of liquid mass near the free surface.

Figure 5D:
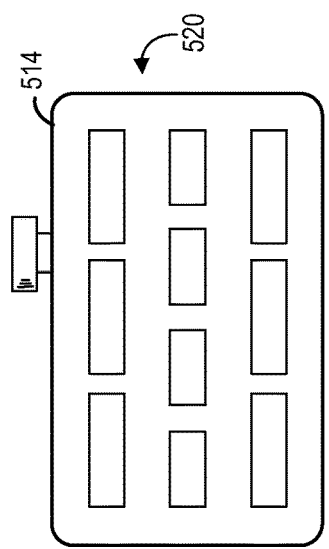
FIGS. 5A-O show various example louver plate types and arrangements leading to different flow effects according to the present description.
Figure 5C:
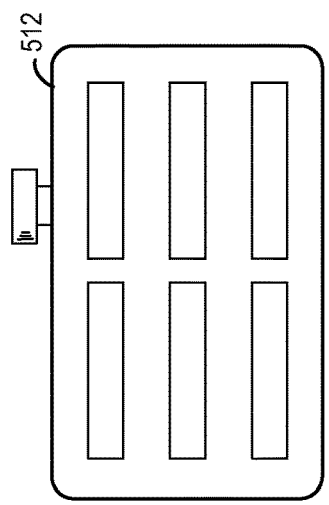
Figure 5B:
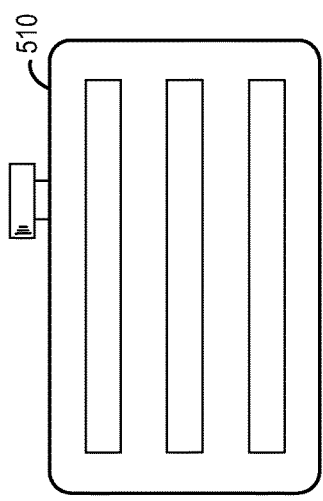

FIGS. 5B-D show further examples where rectangular openings and louvered plates are divided into multiple openings along the length of the baffle. For example, FIG. 5B shows slatted baffle 510 with a single opening as described above with respect to FIG. 3B. FIG. 5C further shows split baffle 512 having paired rectangular openings in a horizontal plane along the length of the baffle plate. Further, FIG. 5D shows differentially aligned baffle 514 wherein the openings of different horizontal planes comprise of different arrangements as depicted by the three rows shown at 520. In this way, the slatted baffle according to the present disclosure also includes arranging the rectangular openings into rows, wherein a length of the rectangular opening depends on a vertical placement of the rectangular opening relative to the baffle, and wherein each row includes a plurality of rectangular openings. Such features allow for different arrangements of angled louver plates to create additional effects such as a flow metering in the vertical dimension that counteracts wave motion and thereby prevent noise created by wave folding. According to the present description, differently arranged slots along the vertical direction within the plane of the baffle allows for differential control of liquid flow rates to vary the amount of fuel transiently crossing the baffle in the vertical direction. Thus, for example, rectangular openings near the bottom of the baffle plane may be configured to allow for a larger liquid flow than the rectangular openings near the top of the baffle. In this way, the liquid flow and therefore wave motion at the top of the baffle may be further reduced relative to the liquid flow near the bottom in order to reduce slosh noise in the fuel tank. Depending on the application, any combination of the arrangements described may be implemented.

Angled louver plates oriented in one direction, that is, extending outward from a first side (e.g., front face 330) of the baffle in one direction as shown in FIGS. 3A-C and 5A provides the effect of a solid baffle in one direction with a slatted baffle that eliminates air entrainment in the other direction. Thus, in one embodiment, the fuel flow in a first direction is at least partially blocked wherein the fuel flow in the second direction opposite to the first is diverted toward a tank bottom, the fuel flow in the first direction being diverted toward the top of the tank in some embodiments. However, in other embodiments, fuel flows simultaneously in the first and second directions, but the fuel flows through the slatted baffle merge smoothly based on the direction of fuel flow across the face of the baffle.

Alternatively, FIGS. 5E and F show baffle plate 530 that includes a configuration wherein angled louver plates extend outward from opposite sides of the baffle (e.g., shown by oppositely oriented louver plates 532 and 534), the louver plates extending from the second side being uniformly inclined with a fixed incline angle relative to the baffle in a range of 15° to 65°, and wherein louver plates extending from the opposite sides of the baffle have an alternating arrangement. Thus, configurations with louver plates oriented in different directions are possible to achieve a more uniform performance independent of wave direction. As described above, the inclined orientation of the oppositely arranged plates may have the same angle relative to the plane of the baffle (e.g., as shown at 536), or one or more of the angles may be different depending on a flow effects desired in the fuel tank.

Figure 5G:
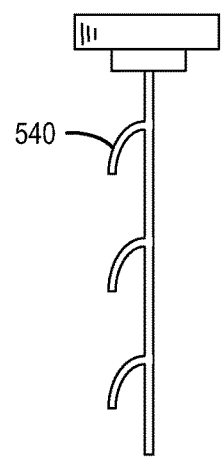
Figure 5H:
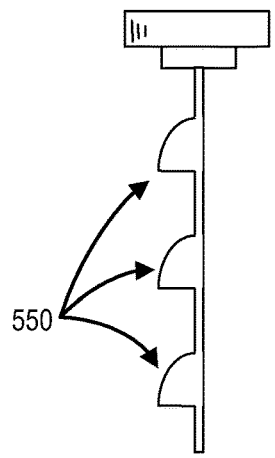
Figure 5I:
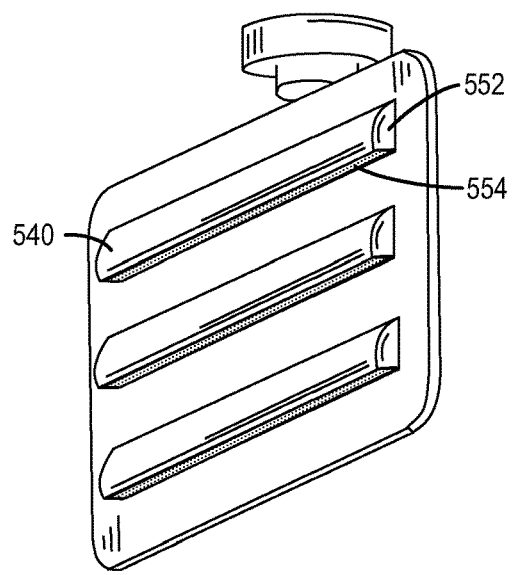

FIGS. 5G-I illustrate further louver plate configurations which may be implemented to avoid near field splashing and/or turbulence. For example, convex louvers 540 may be employed that have a convex shape as shown in FIG. 5G. The shape of the louver plate may thus be one of linear and convex relative to the plane of the baffle, the convex shape acting to reduce near field splash-back and turbulence. Alternatively, the sides of the louver plate may be enclosed to form a bucket shaped opening of FIGS. 5H and I via bucket louver 550. Thus, inclusion of a louver plate with a convex shape may further include side brackets to form a bucket by connecting the convex plate to the plane of the baffle via the side brackets, the bucket extending from three sides of the rectangular opening. According to FIGS. 5H and I, bucket louver 550 attaches to at least two edges of the opening, which may offer advantages by allowing liquid flow only in a downward direction after transiently crossing the opening in the plane of the baffle. For example, redirecting fuel flow in the downward direction increases amount of fuel directed to the bottom of fuel tank compared to the example where an angled louver plate attaches only along one side of the opening (e.g., louver plate 306). The increased flow in the downward direction may allow increased dissipation in some instances that reduces fuel slosh noise within the tank. For simplicity of description, bucket louver 550 is shown comprising convex louver 540 connected to side bracket 552 (e.g., a bracket connecting the convex louver to the baffle plane along a side portion of the louver plate, only one is shown). As described herein, bucket louver 550 may still include a rectangular opening as indicated at 554, although other shapes may also be employed.

Figure 5J:
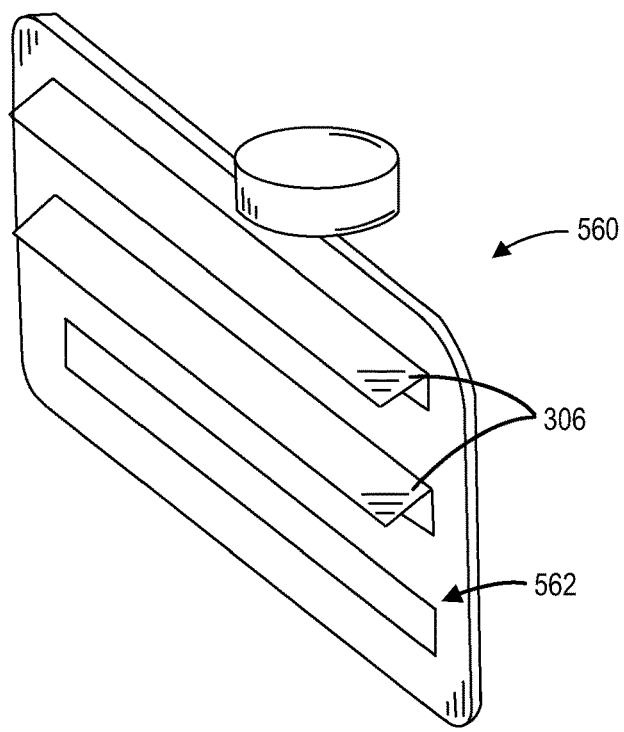
Figure 5K:
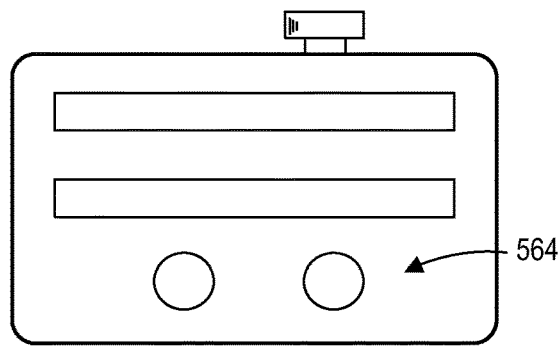
Figure 5L:
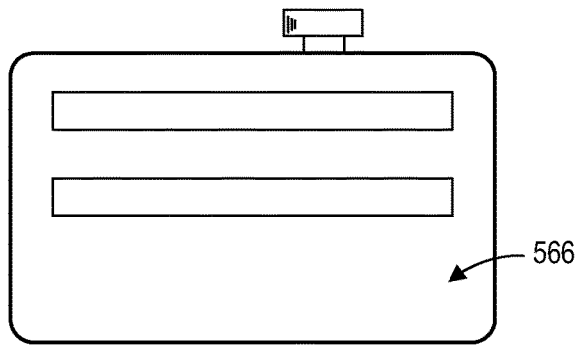

FIGS. 5J-L show additional configurations comprising louvered screen baffles having louvers over some of the openings. In other words, the baffle may further comprise arranging angled louver plates over one or more of the plurality of openings so long as the principles described are enabled. In some instances, the bottom opening may be positioned near the bottom of the tank. Therefore, diversion of the liquid flow in the downward direction may not add additional benefit for the bottom opening. Herein, when a bottom opening includes no louver plate, the bottom opening may have a shape that is one of rectangular, circular and shaped differently than a rectangle or wherein no bottom opening is present, the baffle forming a solid barrier. FIG. 5J illustrates example baffle 560 including two different opening types. Louvered opening 306 represent openings with a louvered plate extending outward from the baffle arranged over the opening in the manner already described. However, uncovered opening 562 is also present and comprises an opening without a louvered plate arranged over the top of the opening. In this way, a louvered baffle according to the present description may include a mixture of louvered openings and uncovered openings. FIG. 5K shows an exemplary baffle where the openings at the bottom of the baffle are uncovered and further comprise differently shaped openings, shown as circular openings 564. The shape of the opening may be altered to control an amount of liquid transfer across the baffle at the bottom of the tank while the liquid at the top is controlled and deflected via the presence of the angled louvers. In FIG. 5L, arrow 566 indicates an example baffle including no openings at the bottom of the baffle.

Figure 5M:
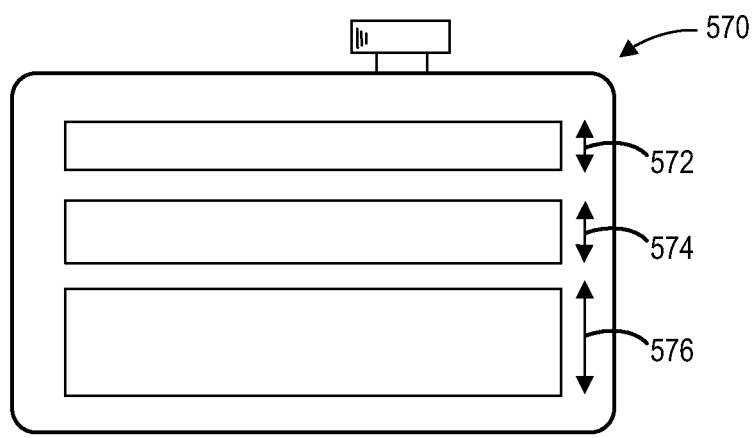

FIG. 5M illustrates progressive baffle 570 that is a louvered screen baffle having openings arranged with a varying slot width. Varying the slot width may provide advantages with respect to differential flow restriction (e.g., the fuel flows more freely near the bottom of the baffle), flow guidance and reduction of air entrainment near the free surface flow. In the example shown, bottom width 576 exceeds middle width 574 that further exceeds top width 572. With this arrangement, the rate of liquid flow near the bottom of the baffle may be larger than the rate of liquid flow near the top of the baffle to reduce fuel slosh noise. However, in other examples, the widths of the openings relative to one another may be arranged differently (e.g., the top width is the largest and the width decreases in the downward direction).

Figure 5N:
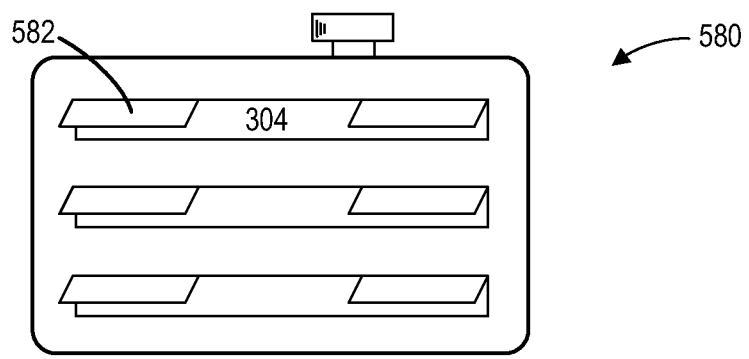
Figure 5O:
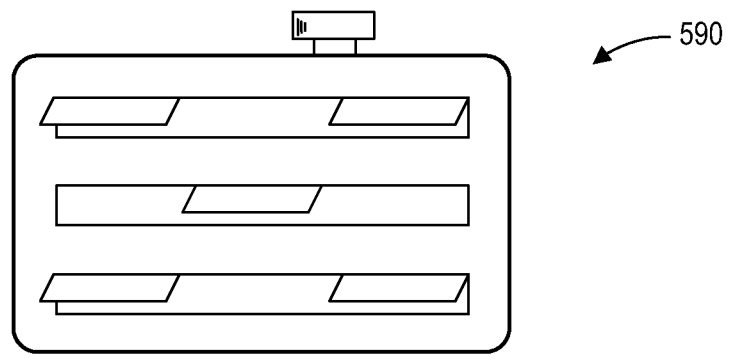

FIGS. 5N-O illustrate further examples where the angled louvers cover a portion of each opening. In this way, the angled louver may be arranged over an opening but partially extend a horizontal distance along the length of the opening. Said another way, examples are conceivable wherein portions of the openings are left uncovered and so include no angled louver over the top. Thus, in addition to the examples above wherein the rectangular openings are arranged into rows, and wherein each row includes one or more rectangular openings, the length of the rectangular opening depending on a vertical placement relative to the baffle in some instances, the louver plate may be arranged over a rectangular opening within each row such that the louver plate covers one of substantially all and a portion of the rectangular opening, each opening having one or more louver plates when the louver plate covers a portion of the rectangular opening, the arrangement of louver plates relative to the baffle having an aligned or scattered arrangement. FIG. 5N shows one such arrangement with an aligned louver arrangement 580. Therein, partial louvers 582 (e.g., one partial louver indicated) cover a portion of rectangular openings 304. Likewise, scattered louver arrangement 590 further illustrates a configuration that places the louvers at different horizontal positions based on the vertical position of the opening. Such arrangements may also be combined with the other elements described to reduce fuel slosh noise emanating from the fuel tank.

FIGS. 6A-C show example flow restrictions for additional configurations wherein louvered plates extend on both sides of the baffle plane. That is, horizontal extensions are included and extend outwardly from the baffle from a second side opposite the first side of the baffle, where the horizontal extensions are configured to direct liquid flow. The advantage of adding a horizontal extension onto the opposite side of the baffle is that a wave travelling across the baffle (e.g., left to right as shown), may prevent upward flow of the liquid and thus reduce turbulence and air entrainment in addition to the other advantages described above. In some embodiments, horizontal extensions may enhance the performance of the slatted baffle described with regard to reduction of slosh noise. For ease of comparison, FIG. 6A illustrates a baffle with no horizontal extension whereas FIG. 6B shows a baffle with a horizontal extension on the opposite side of the baffle. FIG. 6C further illustrates louvers with horizontal extensions on the other side having a contoured shape. Louver plates extending from the opposite side of the baffle further comprising one or more of straight and curved features such that the contoured (or convex shaped) horizontal extension guides fuel flow downwards when the wave travels from left to right without providing additional flow restrictions to the wave travelling from right to left. The advantage of this configuration is that slosh attenuation may be equalized in both directions.

Figure 6D:
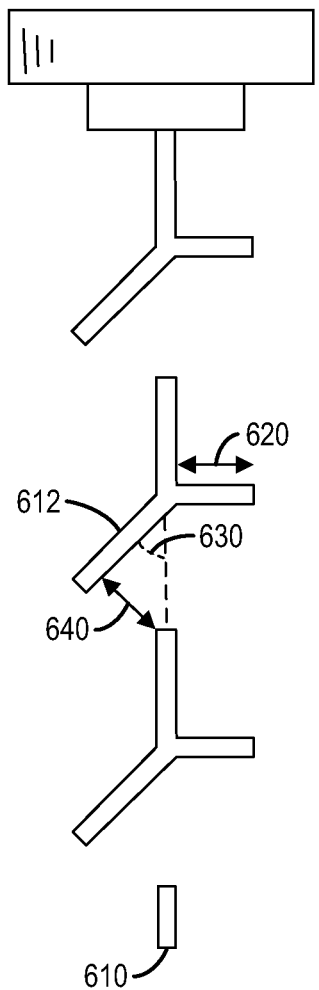

For example, FIG. 6D illustrates a louvered baffle in greater detail to illustrate how a dimensional variation may be employed to achieve a flow effect. For example, baffle 610 is configured with angled louver plate 612 having horizontal extensions 620. The louver angle created by attachment of angled louver plate 612 to baffle 610 is indicated at 630, which may determine a geometric arrangement of hole opening 640 as shown. Based on the geometric relationship of horizontal extension 620 and hole opening 640, a transverse flow through the baffle may be generated. In some embodiments, the ratio of horizontal extension 620 to hole opening 640 exceeds or equals a reciprocal cosine of louver angle 630. Thus, a relationship exists whose specific arrangement may be used to alter the direction of fuel flow across the plane of the baffle, which further allows for control of the flow merging therefrom for the reduction of fuel slosh noise.

Flow simulations may indicate turbulence within a fuel tank, and therefore slosh noise reduction in the fuel tank. FIGS. 7A-C depict liquid flow according to the present description compared to the baffle that allows turbulent flows to develop. The results shown are based on CAE simulations. For comparison, FIG. 7A illustrates a 'through hole' baffle technology that exhibits substantial turbulence based on the arrangement of the opening. When configured in this way, additional problems may arise when the fuel tank is partially filled, which renders the through-hole partially open to air. Increased air entrainment thereby causes further slosh noise. Then, FIGS. 7B and C show the action of louvered baffles in two directions to illustrate how flow may be partially blocked in one direction while being diverted, or altered, in the second direction.

For reference, FIG. 7A shows planar baffle 702 including no angled louver. Wave motion 704 traveling in a first direction from left to right is included and incident on the hole opening as shown. As the wave enters the hole, liquid constriction occurs that may reduce a velocity therethrough. Then, as the wave emerges on the other side turbulent mixing may occur when liquid traversing the opening collides with surface liquid 706 traveling in the second direction. For this reason, turbulent region 708 is shown that coincides with the region wherein liquid collisions and mixing occurs, which lie very near to the hole opening. Such an arrangement does not effectively reduce fuel slosh noise.

In comparison, FIGS. 7B and C show how a slatted baffle configured according to the present disclosure is formed with an opening to allow liquid flow therethrough, the louver plate included to alter a direction of the fuel flow based on the direction of the fuel flow incident on the louvered baffle.

As described above, the opening has a rectangular shape with a width shorter than a length of the louvered plate extending outward from the plane of the baffle. However, other arrangements and openings are possible as long as a fuel flow effectively reduces fuel slosh noise via the altering of the fuel flow. The inventors have further found that altering a direction of the fuel flow in a downward direction offers certain advantages. Thus, the descriptions herein relate to diverting of the fuel flow toward the tank bottom to reduce air entrainment. Moreover, the diverted fuel flow and tank bottom are designed to cooperatively act when reducing a wave impact on a fuel surface.

FIG. 7B shows louvered baffle 712 with wave motion 714 traveling in the first direction toward the side of the baffle with an angled louver plate extending therefrom. In this instance, wave motion 714 is traveling from left to right. As the wave encounters the hole with the angled louver plate, a restricted flow develops that emerges on the other side in an upward direction, and therefore mixes smoothly with under flow 716 traveling in the second direction on the other side of the louvered baffle. For this reason, a smoothly mixed region 718 is shown that coincides with a region wherein liquid traversing the opening is mixed with the liquid present on the other side such that efficient mixing occurs and reduces the slosh noise.

Alternatively, FIG. 7C shows louvered baffle 722 with wave motion 724 traveling in the second direction toward the side of the baffle opposite the angled louver plate extending therefrom. In this instance, as the wave encounters the hole opposite the angled louver plate, and a restricted flow develops that emerges smoothly on the other side in a downward direction, which smoothly mixes with surface flow 726 on the other side of the louvered baffle. For this reason, smooth and non-turbulent region 728, which is another smoothly mixed region, is shown coinciding with a region of liquid traversing the opening that is mixed with the liquid present on the other side that results in efficient mixing while also reducing air entrainment to reduce the slosh noise.

In this way, the fuel flow in the fuel tank on a fuel surface merges smoothly with the fuel flow through the slatted baffle that is altered via inclusion of the louvered plates. FIG. 7B shows how the fuel flow in a first direction incident on the louvered plate extending from the slatted baffle is at least partially blocked whereas FIG. 7C shows how the fuel flow in a second direction opposite the first is diverted toward a tank bottom, the fuel flow in the first direction being diverted toward the top of the tank in the example shown. In some case, the fuel flows in first and second directions simultaneously to create the sloshing and wave effects associated with the fuel tank. However, when the fuel tank includes a slatted baffle according to the present disclosure, advantages are realized with respect to the reduction of slosh noise since fuel flows are merged smoothly responsive to the direction of the fuel flow through the slatted baffle. Thus, a fuel slosh noise may be reduced by combining the effects of a solid and slatted baffle according to the present disclosure, which allows air entrainment to be eliminated when liquid pass through the baffle and further reduces the wave impact on fuel tank walls.

Note that the example controls included herein can be used with various engine and/or vehicle system configurations. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used.

It will be appreciated that the configurations disclosed herein are exemplary in nature, and that these specific embodiments are not to be considered in a limiting sense, because numerous variations are possible. For example, the above technology can be applied to various engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A liquid storage system of a vehicle, comprising:
   a securely attached vertical baffle with a plurality of rectangular openings in the baffle; and
   a plurality of fixed-angle angled louver plates extending outward from and attached directly to the baffle, the fixed-angle louver plates each respectively arranged at and over one or more of the plurality of rectangular openings, the fixed-angle louver plates angled from a top edge of the one or more plurality of rectangular openings downward and outward with respect to the baffle, wherein at least a first fixed-angle louver plate of the plurality of fixed-angle louver plates is positioned vertically above at least a second fixed-angle louver plate of the plurality of fixed-angle louver plates, the first fixed-angle louver plate extending from the baffle toward a bottom of a fuel tank at a different, less shallow, angle relative to a plane of the baffle than the second fixed-angle louver plate.

2. The liquid storage system of claim 1, wherein a length of one of the fixed-angle louver plates is one of equal to or greater than a width of the respective rectangular opening, and wherein the baffle has two faces each arranged in a vertical direction perpendicular to ground on which the vehicle sits.

3. The liquid storage system of claim 2, wherein one of the fixed-angle louver plates extends outwardly from a first side of the baffle, each of the plurality of fixed-angle louver plates being uniformly inclined with a fixed incline angle relative to the baffle in a range of 15° to 65°.

4. The liquid storage system of claim 2, wherein each of the plurality of fixed-angle louver plates having a different fixed inclination angle relative to the baffle.

5. The liquid storage system of claim 4, wherein the different fixed inclination angles fall within a range of 15° to 65°, and wherein the different fixed inclination angles are arranged such that the fixed-angle louver plates cooperatively direct a flow of liquid within the liquid storage system.

6. A system, comprising:
   a fuel tank, comprising:

a vertical baffle integrally formed with a plurality of fixed-angle louver plates, the baffle configured with a corresponding plurality of openings at least partially covered by the respective fixed-angle louver plates, the baffle openings allowing fuel to flow through the baffle, an edge of each of the fixed-angle louver plates coupled directly to a side surface of the baffle at a respective top edge of each of the baffle openings, wherein at least a first fixed-angle louver plate of the plurality of fixed-angle plates is positioned vertically above at least a second fixed-angle louver plate of the plurality of fixed-angle louver plates, the first fixed-angle louver plate extending from the baffle toward a bottom of the fuel tank at a different, less shallow, angle relative to a plane of the baffle than the second fixed-angle louver plate.

7. The system of claim 6 further comprising a vehicle, the vehicle having the fuel tank mounted therein, wherein the fixed-angle louver plates are included to alter a direction of fuel flow, the corresponding plurality of baffle openings having a rectangular shape and a vertical width shorter than a length of the fixed-angle louver plates, where the vehicle is a hybrid-electric vehicle with an internal combustion engine.

8. The system of claim 7, wherein the fixed-angle louver plates extend from the baffle on only one side of the baffle openings, the fixed-angle louver plates having a shape that is one of linear and convex relative to the plane of the baffle.

9. The system of claim 8, wherein the fixed-angle louver plates with the convex shape include side brackets to form a bucket by connecting the convex plate to the plane of the baffle via the side brackets, the bucket extending from three sides of the baffle openings.

10. The system of claim 8, wherein the fixed-angle louver plates having the linear shape extend from the baffle.

11. A vehicle, comprising:
a vehicle powertrain with an internal combustion engine; and
a fuel storage tank for storing engine fuel, including a vertical baffle formed in only one piece, a plurality of rectangular openings within the baffle for allowing a liquid flow, and a plurality of fixed-angle louver plates part of the one piece baffle extending outward from the baffle with a louver length that is one of equal to or greater than a width of the rectangular openings, each fixed-angle louver plate positioned over a respective each one of the plurality of rectangular openings, wherein the baffle has two faces each arranged in a vertical direction perpendicular to ground on which the vehicle sits, each fixed-angle louver plate coupled directly to respective top edges of each of the plurality of rectangular openings within the baffle, wherein at least a first fixed-angle louver plate of the plurality of fixed-angle louver plates is positioned vertically above at least a second fixed-angle louver plate of the plurality of fixed-angle louver plates, the first fixed-angle louver plate extending from the baffle toward a bottom of a fuel tank at a different, less shallow, angle relative to a plane of the baffle than the second fixed-angle louver plate.

12. The vehicle of claim 11, wherein a bottom edge of the baffle within the fuel storage tank is positioned near a bottom of the fuel storage tank, and wherein the plane of the baffle is arranged perpendicular to a longitudinal axis of the vehicle, and wherein the fixed-angle louver plates extend from the baffle in the longitudinal axis of the vehicle.

13. The vehicle of claim 12, wherein a size of the rectangular openings increases based on a vertical position of the rectangular openings relative to a top surface of the fuel storage tank, the size of the rectangular openings determined by an angle of the fixed-angle louver plate extending outward from the baffle relative to the plane of the baffle.

14. The vehicle of claim 13, wherein the length of the fixed-angle louver plates is greater than a width of the rectangular openings, and wherein the fixed-angle louver plates each cover all of the respective rectangular openings, an arrangement of the fixed-angle louver plates relative to the baffle being aligned.

15. The vehicle of claim 12, further comprising another vertical baffle identical to the baffle, wherein faces of the another baffle are parallel to the two faces of the baffle.

* * * * *